(12) United States Patent
Ponnapur et al.

(10) Patent No.: US 8,261,282 B1
(45) Date of Patent: Sep. 4, 2012

(54) SYSTEM AND METHOD FOR VIRTUAL MACHINE HOST LOAD PROTECTION

(75) Inventors: Anil K. Ponnapur, Bangalore (IN); Anurag Palsule, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 979 days.

(21) Appl. No.: 12/242,518

(22) Filed: Sep. 30, 2008

(51) Int. Cl.
  *G06F 9/50* (2006.01)
(52) U.S. Cl. ............................. 718/105; 718/1
(58) Field of Classification Search ............... 718/1, 105
  See application file for complete search history.

(56) References Cited

U.S. PATENT DOCUMENTS

| | | | |
|---|---|---|---|
| 6,618,737 B2* | 9/2003 | Aridor et al. ........................ 1/1 |
| 7,607,129 B2* | 10/2009 | Rosu et al. ........................ 718/1 |
| 7,716,667 B2* | 5/2010 | van Rietschote et al. ......... 718/1 |
| 8,185,893 B2* | 5/2012 | Hyser et al. ....................... 718/1 |
| 2003/0117971 A1* | 6/2003 | Aubury ............................. 370/321 |
| 2006/0080678 A1* | 4/2006 | Bailey et al. ..................... 719/325 |
| 2006/0184935 A1* | 8/2006 | Abels et al. ....................... 718/1 |
| 2006/0195715 A1* | 8/2006 | Herington ......................... 714/4 |
| 2007/0266383 A1* | 11/2007 | White ................................ 718/1 |
| 2007/0283348 A1* | 12/2007 | White ................................ 718/1 |
| 2008/0184229 A1* | 7/2008 | Rosu et al. ........................ 718/1 |
| 2008/0201414 A1* | 8/2008 | Amir Husain et al. ......... 709/203 |
| 2009/0089781 A1* | 4/2009 | Shingai et al. ................... 718/1 |
| 2009/0293022 A1* | 11/2009 | Fries ................................ 716/2 |

* cited by examiner

*Primary Examiner* — Aimee Li
(74) *Attorney, Agent, or Firm* — Perkins Coie LLP

(57) ABSTRACT

Techniques introduced here allow restoration of a virtual machine container using resources of a host least likely to suffer a performance impact from additional loading associated with the restoration of the virtual container. In particular, a protection manager controls the restoration process. Restoration of virtual machine containers is accomplished without overloading any one hosting system where multiple such hosting systems are executing a plurality of virtual machines.

20 Claims, 7 Drawing Sheets

SYSTEM AND METHOD FOR VIRTUAL MACHINE HOST LOAD PROTECTION

BACKGROUND

Computing systems execute operating systems and other software. Such computing systems can be virtualized, that is to say, executed within a virtual execution environment. Virtualization allows multiple virtual machines to share the same physical hardware. In virtualization, a computing system can be reduced to a program executing within a virtual execution environment. Such a program can be termed a virtual machine.

A virtual machine can provide a complete system platform which supports the execution of a complete operating system. One of the advantages of a virtual execution environment is that multiple operating systems (which may or may not be the same type of operating system) can coexist on the same physical platform. In addition, a virtual machine can have instructions and architecture that is different from that of a physical platform in which the virtual machine is implemented.

Typically, data and executable code for a virtual machine are stored in a virtual machine container. A "virtual machine container" is a logical storage unit that can be of either fixed or variable size, for example, a file formatted to include executable code and data storage. For storage purposes, an advantage of virtualization is that regardless of which computing system is executing a virtual machine, many virtual machine containers can be stored by a single hardware storage device, such as a storage system.

A storage system can include a computing system or set of computing systems that offer storage services to the one or more host computing systems via a storage server. For example, a storage server can be used in a storage area network (SAN), or network attached storage (NAS) can be used including one or more mass storage devices. A storage server can allow file level access or block level access to stored data, or both.

While a virtual machine container does not need to be stored on a storage server it can be done so in order to centralize the management of virtual machine containers. In use, the executable code and data stored in a virtual machine container are accessed by a host system, which can be the same computing system as the computing system storing the virtual machine container, or a different computing system. Different computing systems can be used to store virtual machine containers and execute virtual machines stored by the virtual machine containers. Often multiple hosting systems are used to execute the multiple virtual machines and the multiple hosting systems are connected to a storage server to retrieve data and executable code from the virtual machine containers stored in the storage server.

Multiple virtual machine containers can be stored for execution by one or more hosting systems as described above. However, a virtual machine container can become corrupted, data within the file can be lost, or other problems may occur, so as to require to the restoration of the container from a backup.

It should be noted that a "virtual machine" can refer to the virtualized computing system in execution on a hosting system in a virtual execution environment, however, the restoration of a "virtual machine" normally refers to the restoration of a virtual machine container.

One benefit of virtualization is that the restoration of an entire virtual machine container can be made quickly and efficiently. For example, an entire virtual machine container can be copied to a storage system from a backup system to restore the data included therein. In this way many virtual machine containers can be restored.

Restoration of a virtual machine container can be an expensive task in terms of use of the computing resources, e.g., processor and memory, relative to the total resources available to a host computing system. For restoration of multiple virtual machine containers, multiple host machines can be employed. The host machines can both execute restore operations and execute instructions for a virtual machine. The distribution of the load can vary such that each host does not receive an equal load of virtual machines to restore and execute. As used herein, the "load," or "loading" refers to the extent of utilization of computing resources available to a host computing system.

Typically, an administrator selects a host for restoration of a virtual machine container. As such administrator time was required for the restoration of each virtual machine container. As many virtual machine container restorations became required, the toll on administrator time grew. Such administrators would not have sufficient time or resources to determine which hosting system would be the least likely to suffer a performance impact from a plurality of hosting systems. As a result of both the requirement for user input and the large loading requirements of the restoration of virtual machine containers, some hosts can become overloaded relative to other hosts.

Once a host is overloaded it can be costly in terms of resource utilization to change the host on which one or more virtual machines are executing, if it is even possible to move a virtual machine from one host to another. When a host is overloaded its performance tends to degrade. As a result, clients serviced by the host can experience a poor quality of service.

DETAILED DESCRIPTION

Figure 1:
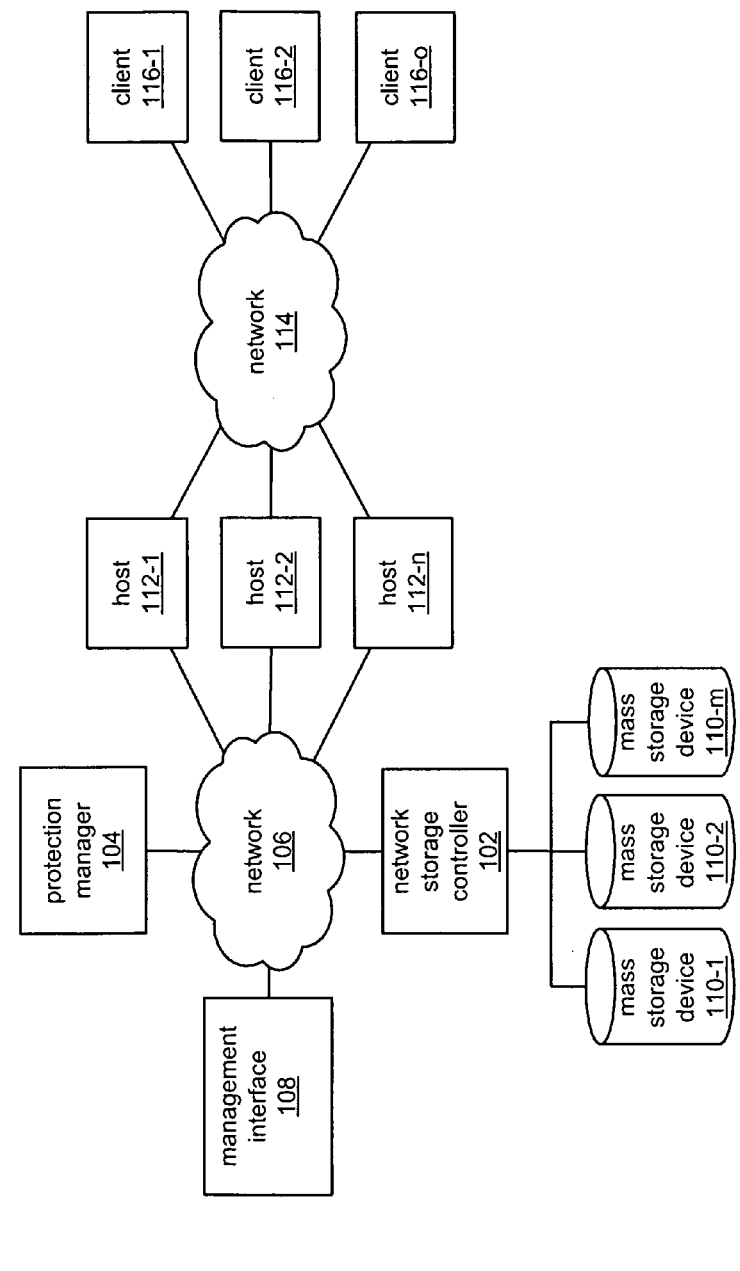
FIG. 1 is a diagram of an example of a system using a protection manager to control loading of hosts.

In accordance with the techniques discussed herein, loading of multiple host computing systems can be managed to ensure a high quality of service from hosting machines executing restoration operations to restore virtual machine containers from backups. Advantageously, distribution of virtual machines can be controlled such that host machines do not receive disproportionate loading. Administrator input is unnecessary as an intelligent entity performs the tasks on behalf of a user desiring to restore the virtual machine container. As described herein the entity is called a "protection manager" which can manage such loading, particularly in regard to distribution of expensive restoration tasks.

Should the administrator desire to select a host, she could do so. Therefore, the administrator can optionally refrain from providing input in the restoration. As used herein "optionally refrain" is defined to mean that the administrator can, but need not transmit a request to indicate that a particular host should be used.

When selecting a host system for restoration of a virtual machine container from a backup, the host can be used to execute costly restoration functions.

Operation of a virtual machine can include execution of instructions for the virtual machine, and may include storage of data. However, a host for the virtual machine may or may not include such storage. When storage is not included in a host system, a storage server can be used to store the data on behalf of the host system.

For operation of a virtual machine, two or more host computing systems can offer fungible resources, and as such, one host can be substituted for another. However, when selecting a host computing system as a destination system for virtual machine restoration, it is important to avoid overloading the host. Thus, it is important to know the loading of each host system.

Accordingly, or as described further below, the protection manager can make use of polling agents which are operable to measure the resources used by host systems. Results of such polling can be stored for analysis by modules of the protection manager. The protection manager can determine the loading of the hosts relative to each other based on the polling results. The loading can be used to identify a hosting system least likely to suffer poor performance during the restoration of the virtual machine. For example, such a hosting system could have the lowest load of the hosting systems, could be unlikely to receive a heavy load in the near future, or could be otherwise less likely to suffer poor performance than other hosing systems. Such a hosting system can be referred to as an "optimally loaded" hosting system or "optimally loaded" host.

One example of a system that is least likely to suffer poor performance is a system having the lowest loading of the plurality of hosting systems at the current time of restoration. The lowest loaded host can be a good choice because other hosts are more likely to suffer a performance impact as the other hosts have fewer available resources.

As it regards performance, average load and future load predictions can be used to anticipate performance impacts from loading. Consider a host that is currently experiencing a low load, but is likely to receive a large amount of loading in the near future. Such a host may not be an optimal choice. As such, average load and a schedule of future transfers can be considered to anticipate performance impacts not recognized when considering current loading alone.

Once the host is determined, the host can be selected for restoration of a virtual machine. Advantageously, loading of hosts is distributed. Any given host is able to provide a high quality of service to clients the host services.

FIG. 1 is a diagram of an example of a system 100 using a protection manager to control loading of hosts. FIG. 1 shows network storage controller 102, protection manager 104, network 106, management interface 108, mass storage devices 110-1 through 110-*m* (collectively mass storage devices 110), hosts 112-1 through 112-*n* (collectively hosts 112), network 114, clients 116-1 through 116-*o* (collectively clients 116). The letters "m," "n," and "o" can each can represent any integer.

The network storage controller 102, e.g. a network storage server, includes a storage operating system (not shown) that includes a storage manager that can logically organize data and to control storage access operations. The storage manager can implement a hierarchical structure of directories and files on logical units. Data stored by a network storage controller 102 can be stored in basic units of data called blocks. A "block" is a sequence of bits or bytes having a length, e.g. 4 bytes, 8 bytes, 128 bits. Files or logical units can be defined from multiple blocks, as can larger units of storage, such as directories and volumes. The network storage controller 102 can provide either block level access or file level access to stored data.

The network storage controller 102 can implement network storage protocols, such as iSCSI (initiator/internet Small Computer System Interface), FCP (Fibre Channel Protocol), NFS (Network File System), SMB/CIFS (Server Message Block/Common Internet File System), hypertext transfer protocol (HTTP), transmission control protocol/internet protocol (TCP/IP), or any other convenient protocol. The network storage controller 102 manages data in the mass storage devices 110. The network storage controller 102 typically includes internal memory, such as dynamic random access memory (DRAM), for buffering data to be read from and written to the mass storage devices 110.

The protection manager 104 is generally responsible for protecting the hosts 112 from overloading. The protection manager 104 includes a plurality of modules discussed in further depth in reference to FIG. 2. The modules have various purposes, for example, storing data from polling agents. A "polling agent" is a software entity that collects data indicative of a level of resource use by a host machine, or other system or device. Polling agents can monitor hosts during restoration of virtual machines to gather data on the loading of the hosts. The protection manager 104 can be included in the network storage controller 102 or can be a separate unit coupled to the network storage controller 102.

Each of the network 106 and the network 114 can be, for example, a local area network (LAN), wide area network (WAN), metropolitan area network (MAN), global area network such as the Internet, a Fibre Channel fabric, any combination of such networks, or any other type of interconnect. Each of the network 106 and the network 114 can include routers, switches and/or other networking hardware elements coupled together to provide communications to and between systems. Communication can be offered within systems and devices coupled to the network 106 or the network 114. The network 114 and the network 106 can be the same network, or different networks.

The management interface 108 can be any terminal, computing system, user interface, protocol handler, or other type of mechanism for receiving instructions to restore a virtual machine to a host computing system. The management interface 108 can be included in the network storage controller 102 or can be included on a separate unit.

The mass storage devices 110 can be, for example, hard disk drives, such as magnetic hard disks, optical disks, or another form of storage for persistently storing large amounts of data.

The hosts 112 can be any type of computing systems and are typically server class computing systems including one or more processors coupled to memory. The hosts 112 may or may not have storage locally accessible. The hosts 112 can also include one or more personal computing systems, network computing systems, or other known or convenient computing systems.

The clients 116 can be individual personal computers, server class computing devices, or any known or convenient computing systems operable to store data over a network on a network storage controller. The clients 116 can store and retrieve data using network storage protocols, such as iSCSI (initiator/internet Small Computer System Interface), FCP (Fibre Channel Protocol), NFS (Network File System), SMB/CIFS (Server Message Block/Common Internet File System), hypertext transfer protocol (HTTP), transmission control protocol/internet protocol (TCP/IP), or any convenient protocol.

In the example of FIG. 1 in operation, the hosts 112 retrieve data from virtual machine containers stored by the network storage controller 102 on the mass storage devices 110. The hosts 112 execute the virtual machines from the virtual machine containers. The virtual machines can offer services to the clients 116.

At some point in time, a virtual machine executing on host 112-1 may require restoration from a backup. In that event, the management interface 108 can receive an instruction/command/request (these terms are used interchangeably) to restore the virtual machine container from a systems administrator, a module within the network storage controller, or another system or individual. The management interface 108 then instructs the protection manager 104 to restore the virtual machine container to the appropriate storage location and initiates execution on a host of the hosts 112 least likely to suffer a performance impact from additional loading associated with restoration of a virtual machine container without requesting input from an administrator in selecting the host.

For example, assume the host 112-2 has the lowest load. The protection manager will generate polling agents to poll the hosts 112 to find the loading on each of the hosts 112. The protection manager will find that host 112-2 has the lowest load or is otherwise least likely to suffer a performance impact from additional loading associated with restoration of a virtual machine container. The protection manager will then generate a restoration agent to restore the virtual machine container using the resources of host 112-2 to execute the instructions causing the restore. Once the container is completely restored, one of the hosts 112 can begin execution of the restored virtual machine within a virtual execution environment (not shown).

Figure 2:
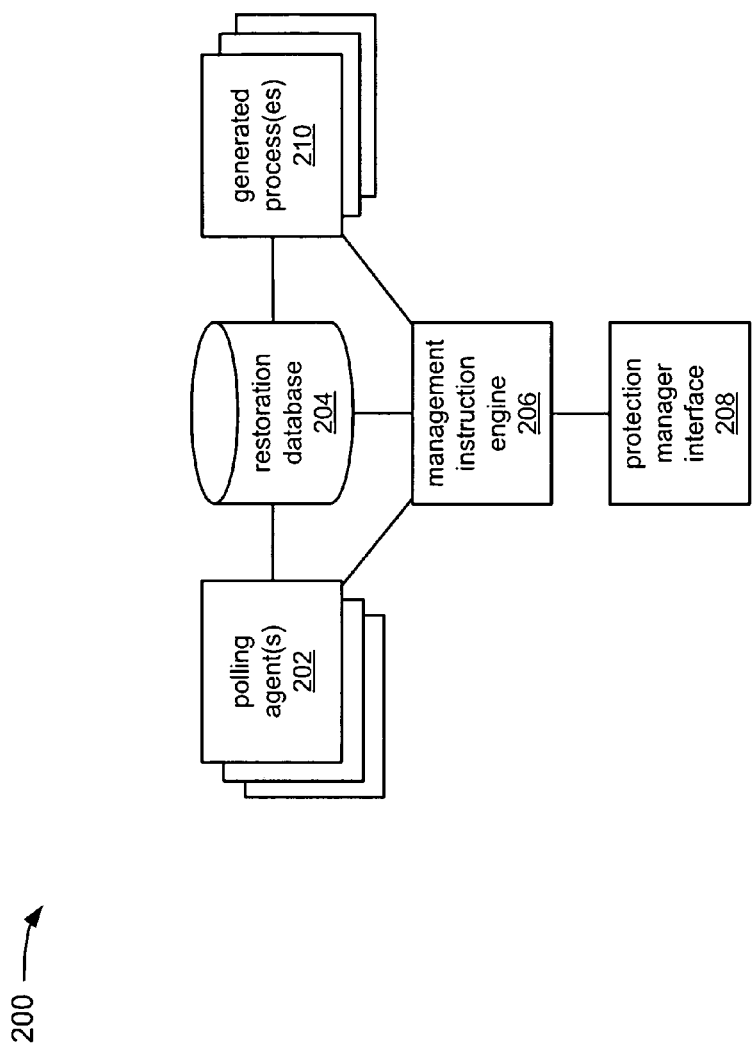
FIG. 2 shows modules of an exemplary protection manager.

FIG. 2 shows modules of an exemplary protection manager 200. The protection manager 200 could be a protection manager 104 as discussed in reference to FIG. 1. FIG. 2 includes polling agent(s) 202, restoration database 204, generated process(es) 210, management instruction engine 206, and protection manager interface 208.

In the example of FIG. 2, the polling agents 202 can be or can include software operable to measure the loading of individual host systems. The loading can be measured as a percentage of total resources of a host system, e.g., CPU use and memory use. A polling agent can be executed to determine and record the loading of a host system.

In the example of FIG. 2, the restoration database 204 can be a data store, list of records, or other known storage unit. The restoration database 204 can include records generated by the modules of the protection manager 200. For example, host system loading can be recorded in such records as well as status of restoration and instructions.

In the example of FIG. 2, the management instruction engine 206 can be or include software operable to control other software and manage data. For example, the management instruction engine 206 can interpret a request to restore a system. Such a request can be interpreted as various tasks, for example: gather polling data, analyze polling data and generate a process to begin the restoration. Such a restoration can begin by, for example, executing instructions to cause a polling agent to begin gathering data on a host. Alternatively, for example, the restoration can begin by retrieving existing polling data from a restoration database. The management instruction engine 206 can receive instructions via the protection manager interface 208.

In the example of FIG. 2, the protection manager interface 208 can be any interface to an external system that can transmit and/or receive data. Such transmissions can be made subject to system interoperability standards that govern the communication and transfer of data in functional units for interpretation by the external systems.

In the example of FIG. 2, the generated processes 210 can be executing software programs operable to restore a virtual machine container to a selected location, for example, within a storage system or within a host system. The generated processes 210 can also begin execution of the virtual machine on a host system.

In the example of FIG. 2, in operation, the protection manager interface 208 receives an instruction to restore a virtual machine container from a network storage controller or a module associated with the network storage controller. The instruction can be interpreted as one or more tasks; for example, two such tasks could include (1) cease execution of an existing virtual machine, and (2) write a copy of the backup virtual machine container over the existing virtual machine container. Additionally, the tasks could include selecting a new storage location at which to write the backup of the virtual machine container. Deletion of the existing virtual machine container could be accomplished first if desirable for the particular circumstances under which the virtual machine container is restored.

If the polling agents 202 are not already executing when the instruction is received, then the management instruction engine 206 begins execution of the polling agents 202. The polling agents 202 gather data describing use of the resources by the hosts and store the data in the restoration database 204. The management instruction engine 206 then analyzes the data stored in the restoration database 204 to determine a host least likely to suffer a performance impact from additional loading associated with restoration of a virtual machine container and generates the generated process(es) 210 to restore the virtual machine container to a location on a storage system or host. Upon completion of the restoration, the generated process(es) 210 terminate and the management instruction engine 206 reports successful restoration via the protection manager interface 208.

Figure 3:
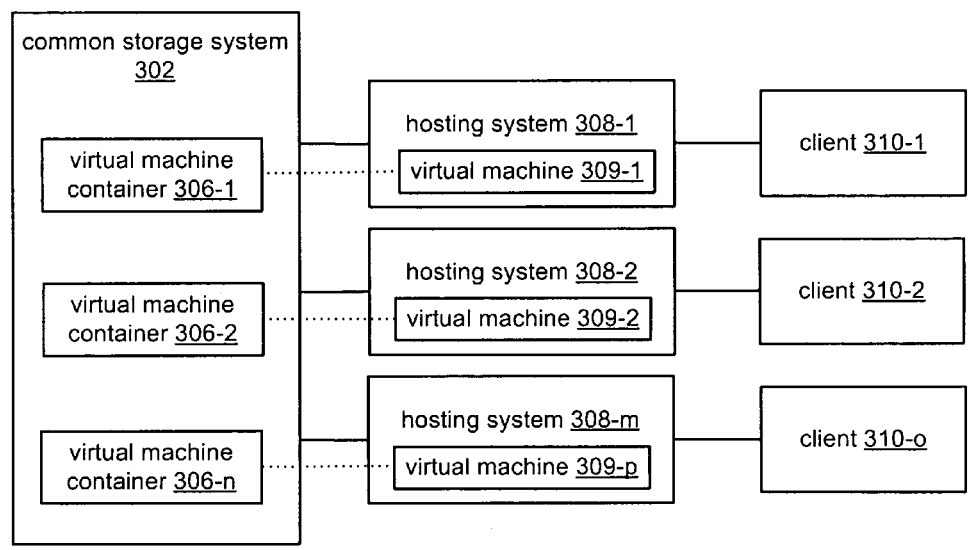
FIG. 3 is a diagram of an example of a system of multiple hosting systems executing virtual machines and serving clients.

FIG. 3 is a diagram of an example of a system 300 including multiple hosting systems executing virtual machines and serving clients. FIG. 3 includes common storage system 302, hosting system 308-1 through 308-n (collectively hosting systems 308), client 308-1 through client 308-m (collectively clients 308), virtual machine 309-1 through virtual machine 309-p (collectively virtual machines 309), and client 310-1 through clients 310-o (collectively clients 310). Common storage system 302 includes virtual machine container 306-1 through 306-o (collectively virtual machine containers 306). The letters "m," "n," "o," and "p" are variables that each can represent any integer.

In the example of FIG. 3, the common storage system 302 is represented as a logical block within FIG. 3, however, the common storage system can include, or be included in, a network storage controller and/or mass storage devices, such as is depicted in reference to FIG. 1. The common storage system 302 includes the virtual machine containers 306.

In the example of FIG. 3, the hosting systems 308 include virtual execution environments for execution of the virtual machine containers 306. The hosting systems 308 can be server class computing systems, desktop computing systems, or other types of computing systems. The hosting systems 308 are coupled to the common storage system 302 and retrieve data from the virtual machine containers for execution of the virtual machines.

In the example of FIG. 3, the virtual machines 309 are units of software in execution at run time within virtual execution environments (not shown). The virtual machines 309 are executed within the virtual execution environments to offer services to the clients 310.

The clients 310 include computing systems executing programs that use the virtual execution environments on the hosting systems 308. The clients 310 can be server class computing systems, desktop computing systems, personal digital assistants (PDAs), wireless devices, notebook computing systems, or any other type of computing systems.

In the example of FIG. 3, in operation, the hosting systems 308 retrieve instructions and data from the virtual machine containers 306 as indicated by the dotted lines in FIG. 3. In this way, the hosting systems 308 store and retrieve data to and from the virtual machine containers 308 to enable the hosting systems 308 to run the virtual machines 309. However, a hosting system 308 does not execute a virtual machine container itself; the hosting systems 308 retrieve instructions from the virtual machine containers 306 and execute the instructions within the virtual execution environment. The virtual machines 309 can then offer services to the clients 310. As indicated by the dotted lines, the instructions stored within a virtual machine container 306 are retrieved by a hosting system 308 to execute in producing the "virtual machine."

At times, data within one of the virtual machine containers 306 may require restoration to the common storage system 302. Restoration of a virtual machine container, for example, virtual machine container 306-1, can be made to the common storage system 302 by use of the resources of one of the hosting systems 308, e.g. hosting system 308-1.

Figure 4:
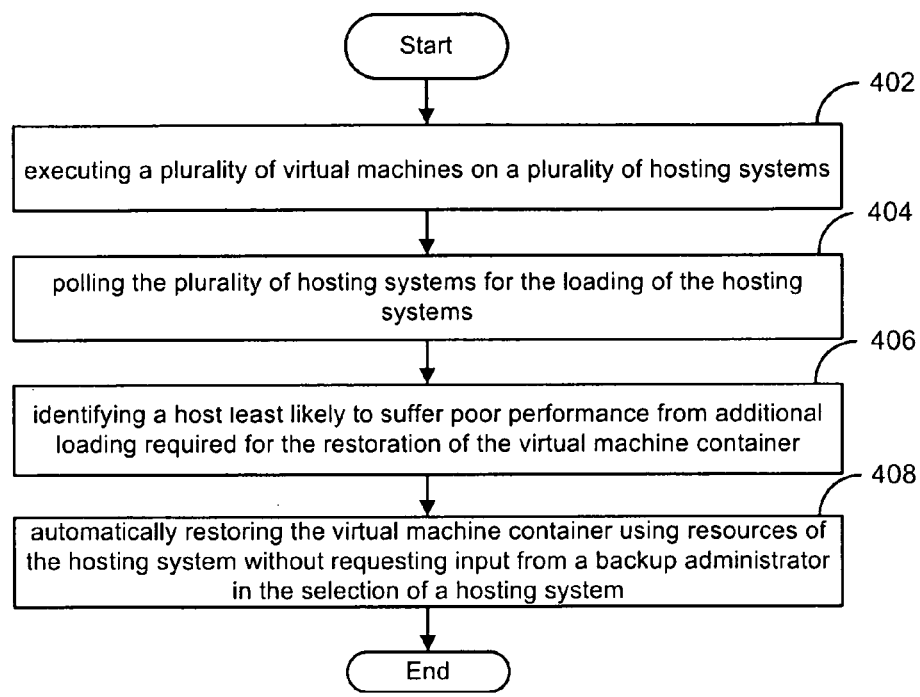
FIG. 4 is a flowchart of a process for restoring a virtual machine to a hosting system least likely to suffer a performance impact.

FIG. 4 is a flowchart of a process 400 for restoring a virtual machine to a hosting system least likely to suffer a performance impact. An automated routine or a user triggers the process by indicating that a network storage controller should restore a virtual machine for execution on a hosting system, such as from a backup.

In the example of FIG. 4, the process starts at 402 with executing multiple virtual machines on one or more hosting systems. The management instruction engine 206 can trigger this operation, as described above. The hosting systems can retrieve instructions from virtual machine containers stored by a common storage system and execute the instructions to produce the virtual machines.

In the example of FIG. 4, the process continues to module 404 with polling the plurality of hosting systems for the loading of the hosting systems. Polling agents 202 can be employed to measure the resources available on the hosting systems. For example central processing unit (CPU) loading, memory loading, and other known or convenient loading can be measured.

In the example of FIG. 4, the process continues to module 406 with identifying a host least likely to suffer poor performance from additional loading required for the restoration of the virtual machine container. The management instruction engine 206 can carry out this operation. For example, the lowest load can be computed by considering the current CPU use and use of various resources within the computing system. Alternatively, the management instruction engine can reference an individual loading factor, or a mathematical evaluation of the factors.

In the example of FIG. 4, the process continues to module 408 with automatically restoring the virtual machine container using resources of the hosting system without requesting input from a backup administrator in the selection of a hosting system. The management instruction engine 206 can initiate the generated process(es) 210. The hosting system can restore the virtual machine container. The process 210 can use computing resources of the hosting system and the process can restore the virtual machine container to any storage location. For example, the process discussed in reference to FIG. 5 could be used to select a location. The process could select a storage server managed by a storage system. Alternatively, a storage location managed by the hosting system could be selected. Having generated a process to restore a virtual machine to the hosting system least likely to suffer a performance impact, the flowchart terminates.

Figure 5:
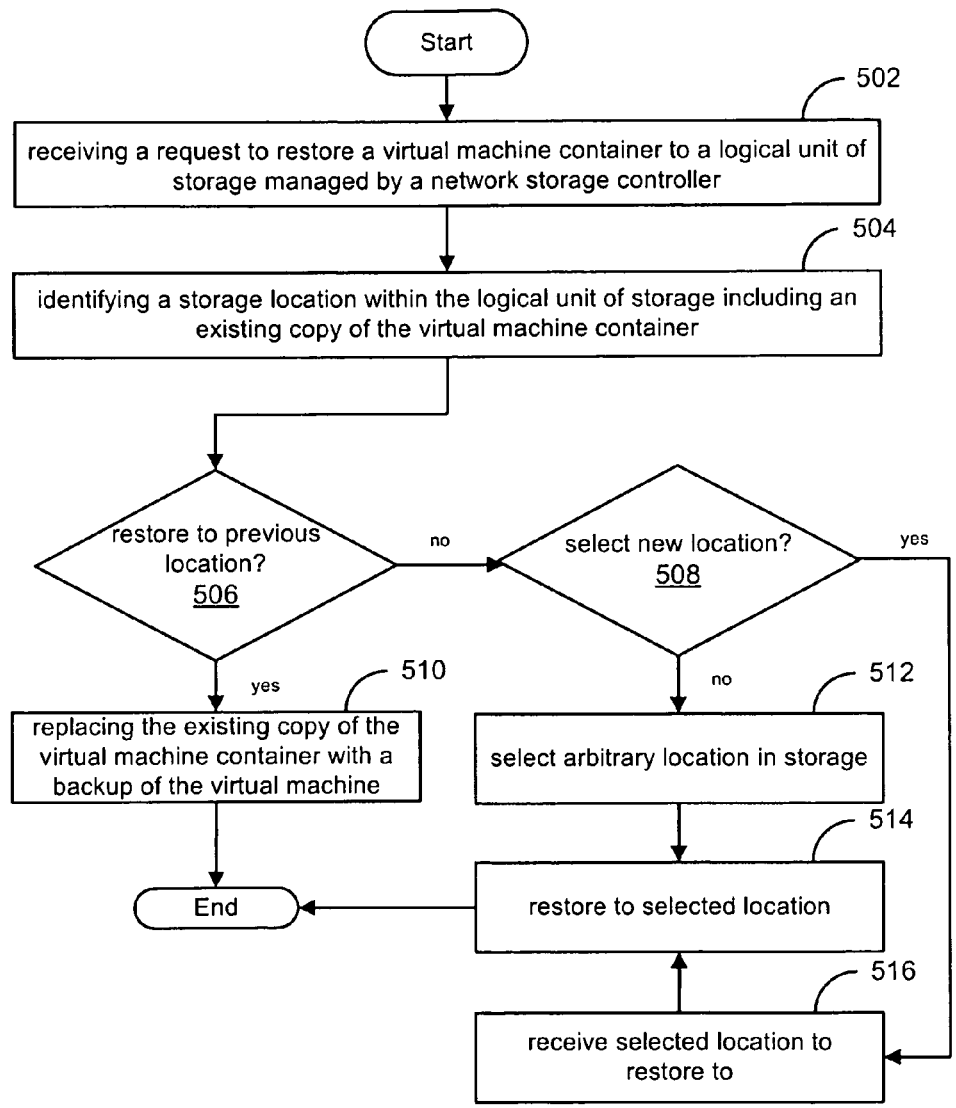
FIG. 5 is a flowchart of a process for selecting a storage location to which to restore a virtual machine.

FIG. 5 is a flowchart of a process 500 for selecting a storage location to which to restore a virtual machine container. An automated routine or a user triggers the process by indicating that a virtual machine container should be restored.

In the example of FIG. 5, the process starts at module 502 with receiving a request to restore a virtual machine container to a logical unit of storage managed by a network storage controller. The request can be received at the protection manager interface, and could have been sent where a previous virtual machine container was corrupted, suffered data loss, or experienced another problem.

In the example of FIG. 5, the process continues to module 504 with identifying a storage location within the logical unit of storage. The logical unit of storage can include an existing copy of the virtual machine container. The management instruction engine 206 can perform this operation. The storage location can be a partition, portion of a logical unit, or other storage unit.

In the example of FIG. 5, the process continues to decision module 506 with deciding whether to restore the virtual machine container to a previous location. The decision can be made by a person instructing the network storage controller, or can be made "on the fly" in accordance with a rule created to determine the location.

If the answer at module 506 is yes, then the process proceeds to module 510 with replacing the existing copy of the virtual machine container with a backup of the virtual machine container. A generated process can replace the virtual machine container with the backup. Having replaced the existing copy of the virtual machine container with a backup of the virtual machine container, the process terminates.

Alternatively, if the answer at module 506 is no, then the process proceeds to decision module 508 with deciding whether or not to select new location to which to restore the virtual machine container. A person can determine a location at which to restore, or a decision can be made automatically based on system constraints, e.g. available storage space. Automated decision making could be accomplished by a management instruction engine.

If the answer at module 508 is yes, then the process proceeds to module 516 with receiving a selected location to which to restore the virtual machine container. Where an individual selects the location to restore to, the system receives the selected location from the individual. Alternatively, where a storage system makes the decision automatically, the decision can be received from the storage system, for example, from a software module of the storage system.

In the example of FIG. 5, from module 508, if the decision at module 508 is no, then the process continues to module 512 with selecting an arbitrary location in storage. The arbitrary location in storage can be completely arbitrary, a first available location, or can be based on system constraints, or other some other basis.

In the example of FIG. 5, from module 516 or module 512, the process continues to module 514 with restoring the virtual machine container to the selected location. Such restoration can include copying data to the selected location from a backup. The backup can reside on another system connected via a network, or can be directly connected. Having restored the virtual machine container to the selected location, the process terminates.

Figure 6:
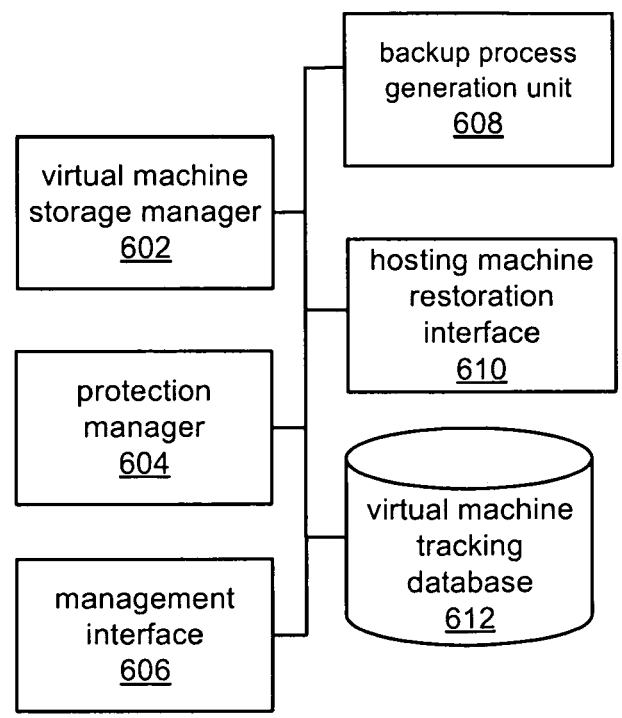
FIG. 6 is a diagram of an example of components of a network storage controller.

FIG. 6 is a diagram of an example of a network storage controller 600. FIG. 6 shows that the storage controller 600 includes virtual machine storage manager 602, protection manager 604, management interface 606, backup process generation unit 608, host machine restoration interface 610, and virtual machine tracking database 612.

In the example of FIG. 6, the virtual machine storage manager 602 monitors virtual machine containers and their storage locations. The virtual machine storage manager 602 records changes to the locations of the virtual machine containers in the virtual machine tracking database 612.

In the example of FIG. 6, the protection manager 604 can be a protection manager as discussed in reference to FIG. 2, including components discussed in reference to FIG. 2.

In the example of FIG. 6, the management interface 606 can be a module implemented in the form of software, hardware, firmware or a combination thereof. The management interface 606 can receive user instructions and control other units within the network storage controller.

In the example of FIG. 6, the backup process generation unit 608 can receive instructions from, e.g., the protection manager 604 to initiate the restoration of virtual machine containers to storage within the network storage controller 600.

In the example of FIG. 6, the hosting machine restoration interface 610 can be used to transmit and receive instructions and data with hosting systems executing virtual machines in virtual execution environments. The interface can couple the hosts to the network storage controller 600, or where a single computing system is used for both hosts and storage, the hosting machine restoration interface 610 can be software executing in memory to operatively connect the hosting systems to the virtual machine containers stored by the network storage controller 600.

In the example of FIG. 6, the virtual machine tracking database 612 can be any form of data store, relational database, data structure, file, logical container, or other unit storing data about the virtual machine containers. Such data can include, for example, the location and status of the virtual machine containers.

Figure 7:
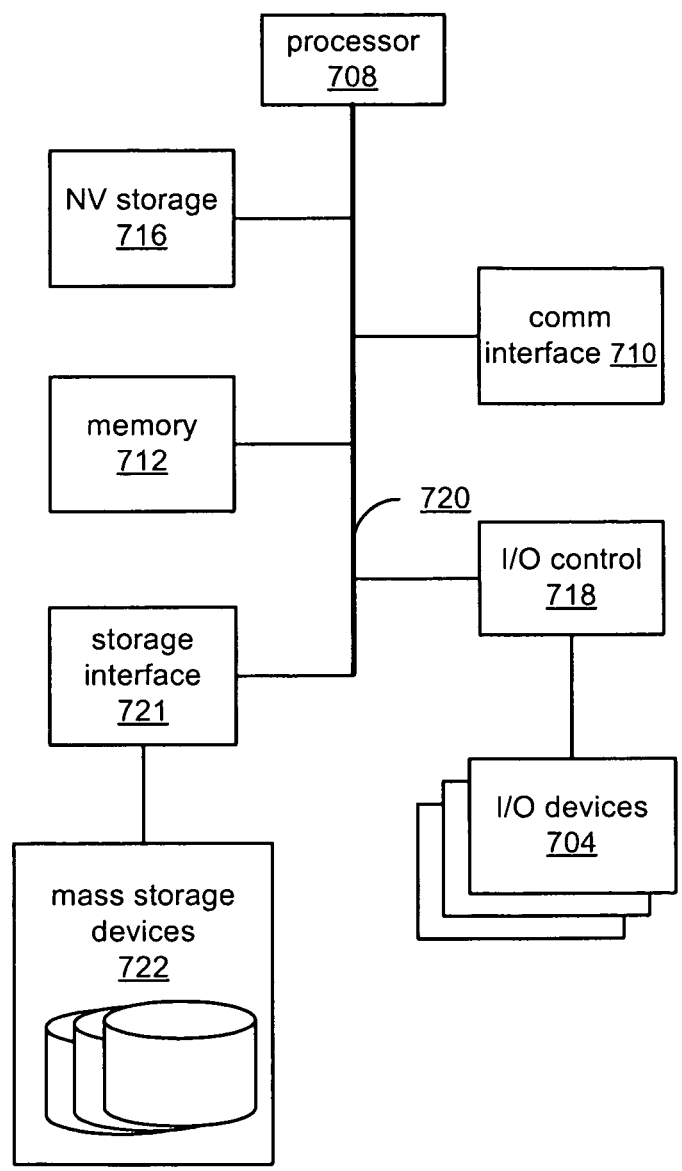
FIG. 7 is a high-level block diagram showing an example of the architecture of a processing system that can be representative of any of the processing systems discussed herein, such as a host or network storage controller.

FIG. 7 is a high-level block diagram showing an example of the architecture of a processing system 700 that can be representative of any of the processing systems discussed herein, such as a host, or network storage controller or client. The system 700 may be a conventional computing system that can be used as a client computing system, such as a personal computing system, hand held device, workstation, or server-class computing system. The system 700 includes I/O devices 704, processor 708, storage interface 721, a communications interface 710, memory 712, non-volatile storage 716, I/O controller 718.

The communications interface 710 may include a modem or network interface. The communications interface 710 can be an ethernet adapter, a Fibre Channel (FC) adapter, an analog modem, ISDN modem or terminal adapter, cable modem, token ring IEEE 802.5 interface, Ethernet/IEEE 802.3 interface, wireless 802.11 interface, satellite transmission interface (e.g. "direct PC"), WiMAX/IEEE 802.16 interface, Bluetooth interface, cellular/mobile phone interface, third generation (3G) mobile phone interface, code division multiple access (CDMA) interface, Evolution-Data Optimized (EVDO) interface, general packet radio service (GPRS) interface, Enhanced GPRS (EDGE/EGPRS), High-Speed Downlink Packet Access (HSPDA) interface, or other interfaces for coupling a computer system to other computer systems.

The processor 708 may be, for example, a conventional programmable microprocessor such as an Intel Pentium microprocessor or Motorola power PC microprocessor. The memory 712 is coupled to the processor 708 by a bus 720. The memory 712 can be Dynamic Random Access Memory (DRAM) and can also include Static RAM (SRAM). The bus 720 couples the processor 708 to the communications interface 710, to the memory 712, also to the non-volatile (NV) storage 716, to the I/O controller 718, and to the mass storage interface 721.

The I/O devices 704 can include a keyboard, disk drives, printers, a scanner, and other input and output devices, including a mouse or other pointing device.

The non-volatile storage 716 can be or include a magnetic hard disk, flash memory, an optical disk, or another form of persistent storage for large amounts of data. Some of this data is often written, by a direct memory access process, into memory 712 during execution of software. One of skill in the art will immediately recognize that the terms "machine-readable medium" or "computer-readable medium" includes any type of information storage device that is accessible by the processor 708.

The storage interface 721 includes input/output (I/O) interface circuitry that couples the storage interface 721 to mass storage devices disks over an I/O interconnect arrangement, such as a conventional high-performance, FC (Fibre Channel) serial link topology. Information may be stored on any type of attached array of writable storage device media such as video tape, optical, DVD, magnetic tape, bubble memory, electronic random access memory, micro-electro mechanical and any other similar media adapted to store information, including data and parity information. The mass storage devices 722 are often magnetic hard disks, optical disks, or another form of storage for large amounts of data.

The system 700 is one example of many possible computing systems which have different architectures. For example, personal computers (PCs) based on an Intel microprocessor often have multiple buses, one of which can be an I/O bus for the peripherals and one that directly connects the processor 708 and the memory 712 (often referred to as a memory bus). The buses are connected together through bridge components that perform any necessary translation due to differing bus protocols.

Network computing devices are another type of computing system that can be used in conjunction with the teachings provided herein. Network computing devices do not usually include a hard disk or other mass storage, and the executable programs are loaded from a network connection into the memory 712 for execution by the processor 708. A typical computing system will usually include at least a processor, memory, and a bus coupling the memory to the processor.

Software or firmware embodying the techniques introduced above can be stored in memory 712, NV storage 716, and/or mass storage devices 722. The software and firmware can also be included on one or more external systems coupled to the processing system 700 by the communication interface 710, and/or an I/O device included in the I/O devices 704.

In addition, the system 700 is controlled by operating system software which includes a logical container management system, such as a disk operating system, which is part of the operating system software (these components are not shown in FIG. 7). One example of operating system software with its associated logical container management system software is the family of operating systems known as Data OnTap® from NetApp, Inc. of Sunnyvale, Calif., with its associated WAFL (write anywhere file layout) file system. The logical container management system is typically stored in the non-volatile storage 716 and causes the processor 708 to execute the various acts required by the operating system to input and output data and to store data in memory, including storing logical containers on the non-volatile storage 716.

The techniques discussed above allow restoration of virtual machine containers using resources of a host least likely to suffer a performance impact without requiring the input of a backup administrator. In particular, a protection manager controls the restoration process to balance host loading for multiple virtual machines. Advantageously, restoration of virtual machine containers is accomplished without overloading any one hosting system where multiple such hosting systems are executing a plurality of virtual machines.

What is claimed is:

1. A method comprising:
   executing a plurality of virtual machines on a plurality of hosting systems;
   polling the plurality of hosting systems for information regarding a current load and an expected future load of each of the plurality of hosting systems; wherein the information is stored in a polling database;
   in response to a command to restore a virtual machine container from a backup and in absence of a host selection from an administrator, automatically selecting a host for restoration of the virtual machine container based on the information; and
   automatically restoring the virtual machine container using resources of the selected host.

2. The method of claim 1 further comprising identifying a storage location within storage managed by a network storage controller to which to restore the virtual machine container using the resources of the selected host.

3. The method of claim 1 further comprising requesting the restoring from a management interface executed on a remote device.

4. The method of claim 1 further comprising storing data indicating progress of the restoring in a virtual machine tracking database.

5. The method of claim 1 further comprising selecting a location to which to restore the virtual machine container that is different from a storage location in which the virtual machine container was previously located.

6. The method of claim 1 further comprising automatically deleting a previous copy of the virtual machine container independent of a request from the administrator.

7. The method of claim 1 further comprising receiving an error and restarting restoration of the virtual machine container while refraining from requesting input from the administrator.

8. The method of claim 1 further comprising initiating a management instruction engine to receive, from the administrator, a request to restore the virtual machine container.

9. A system comprising:
   a network storage controller storing a plurality of virtual machines;
   a plurality of hosting systems executing the virtual machines, the plurality of hosting systems loaded with various processing tasks;
   a plurality of polling agents monitoring loading information including current loading and expected future loading of the plurality of hosting systems; and
   a protection manager coupled to the network storage controller, the protection manager configured to automatically initiate a restore of a virtual machine container to a storage location managed by the network storage controller using the resources of a hosting system, wherein the hosting system is selected from the plurality of hosting systems based on the loading information; wherein an administrator can optionally override the system by selecting a different host; and wherein the hosting system maintains a service for a client receiving services while restoring the virtual machine container.

10. The system of claim 9 further comprising a virtual machine tracking database storing records of virtual machines included in storage managed by the network storage controller.

11. The system of claim 9 further comprising a management instruction engine receiving a request to restore the virtual machine container.

12. The system of claim 9 further comprising a virtual machine storage manager controlling data transfer between the selected hosting system and the network storage controller.

13. The system of claim 9 further comprising a backup process generation unit executing a process operable to restore a backup of the virtual machine.

14. A method comprising:
   receiving a request to restore a virtual machine container to a logical unit of storage managed by a network storage controller;
   identifying a storage location within the logical unit of storage including an existing copy of the virtual machine container, the storage location accessible by the network storage server;
   polling a plurality of hosting systems for a load of each hosting system, the load describing current and future resource use of each of the plurality of hosting systems, the load used for analysis in restoration of the virtual machine container;
   identifying a host for the restoration of the virtual machine container based on the load when a host selection is not provided by an administrator; and
   automatically generating a process to restore the virtual machine container using resources of the identified host.

15. The method of claim 14 further comprising selecting a location to which to restore the virtual machine container using the resources of the identified host during restoration of the virtual machine.

16. The method of claim 14 further comprising recording progress of the process to restore the virtual machine container to a restoration database.

17. A network storage controller comprising:
   a virtual machine tracking database to store records of virtual machine containers, the records tracking progress of restoration of a virtual machine container, the records created by a process generated to perform a restoration of a virtual machine container; and
   a protection manager to receive an instruction to restore the virtual machine container, the protection manager to initiate one or more polling agents to gather current and future loading data for a plurality of hosts and to automatically generate a process to restore the virtual machine container using the resources of a host selected from the plurality of hosts based on the loading data; wherein an administrator can optionally select an alternate host for restoration.

18. The network storage controller of claim 17 further comprising a backup process generation unit to receive an instruction to restore the virtual machine container to a storage location.

19. The network storage controller of claim 17 further comprising a management interface to receive an instruction to restore the virtual machine container.

20. The network storage controller of claim 17 further comprising a hosting machine restoration interface for transmitting data to and receiving data from hosting systems executing virtual machines in virtual execution environments.

* * * * *